(12) United States Patent
Hinkle et al.

(10) Patent No.: US 10,911,410 B1
(45) Date of Patent: Feb. 2, 2021

(54) MANAGED NETWORK CONTENT MONITORING AND FILTERING SYSTEM AND METHOD

(71) Applicant: SECURLY, INC., San Jose, CA (US)

(72) Inventors: David Hinkle, San Jose, CA (US); Vamsee Krishna, San Jose, CA (US); Tigran Gevorgyan, San Jose, CA (US); Amar Patekar, San Jose, CA (US); Vinay Mahadik, San Jose, CA (US)

(73) Assignee: SECURLY, INC., San Jose, CA (US)

( * ) Notice: Subject to any disclaimer, the term of this patent is extended or adjusted under 35 U.S.C. 154(b) by 0 days.

(21) Appl. No.: 16/414,738

(22) Filed: May 16, 2019

Related U.S. Application Data

(60) Provisional application No. 62/672,964, filed on May 17, 2018.

(51) Int. Cl.
| | | |
|---|---|---|
| *H04L 29/06* | (2006.01) | |
| *G06F 16/955* | (2019.01) | |
| *H04L 29/12* | (2006.01) | |
| *G06F 16/27* | (2019.01) | |
| *G06F 21/62* | (2013.01) | |
| *H04L 12/58* | (2006.01) | |
| *H04L 12/741* | (2013.01) | |

(52) U.S. Cl.
CPC ......... *H04L 63/0281* (2013.01); *G06F 16/27* (2019.01); *G06F 16/955* (2019.01); *G06F 21/6218* (2013.01); *H04L 29/06551* (2013.01); *H04L 29/06578* (2013.01); *H04L 45/745* (2013.01); *H04L 51/12* (2013.01); *H04L 61/1511* (2013.01); *H04L 63/0227* (2013.01)

(58) Field of Classification Search
CPC ........... H04L 63/0281; H04L 29/06578; H04L 45/745; H04L 63/0227; H04L 51/12; H04L 29/06551; H04L 61/1511; G06F 21/6218; G06F 16/27; G06F 16/955
See application file for complete search history.

(56) References Cited

U.S. PATENT DOCUMENTS

| | | | |
|---|---|---|---|
| 7,233,997 B1 * | 6/2007 | Leveridge | H04L 63/0807 709/217 |
| 7,409,451 B1 * | 8/2008 | Meenan | H04L 12/5692 379/100.15 |
| 7,698,375 B2 | 4/2010 | Hinton | |
| 7,778,194 B1 | 8/2010 | Yung | |
| 7,849,502 B1 | 12/2010 | Bloch et al. | |
| 8,001,263 B2 | 8/2011 | Lee | |
| 8,111,154 B1 | 2/2012 | Puri | |
| 8,166,141 B1 | 4/2012 | Van Home, III | |
| 8,412,154 B1 | 4/2013 | Leemet | |
| 8,527,631 B1 | 9/2013 | Liang | |
| 8,676,922 B1 | 3/2014 | Milner | |
| 8,763,078 B1 | 6/2014 | Castellucci | |
| 8,973,088 B1 | 3/2015 | Leung | |

(Continued)

*Primary Examiner* — Ramy M Osman
(74) *Attorney, Agent, or Firm* — DLA Piper LLP (US)

(57) ABSTRACT

A system and method for content request monitoring and filtering for a plurality of managed devices in a managed network uses a smart PAC file that is uniquely associated with a particular user using a particular managed device and a DNS look up to perform both the logging/monitoring of the content request and the filtering without a hardware appliance or partial proxying.

6 Claims, 6 Drawing Sheets

(56) References Cited

U.S. PATENT DOCUMENTS

| | | | |
|---|---|---|---|
| 8,977,728 B1* | 3/2015 | Martini | H04L 61/1511 |
| | | | 709/222 |
| 8,990,425 B1 | 3/2015 | Martini | |
| 9,077,688 B2 | 7/2015 | Amit et al. | |
| 9,207,953 B1 | 12/2015 | Shokhor | |
| 9,544,189 B2 | 1/2017 | Martini et al. | |
| 9,602,467 B2 | 3/2017 | Mahadik et al. | |
| 9,736,185 B1* | 8/2017 | Belamaric | H04L 63/20 |
| 10,003,576 B2* | 6/2018 | Hopen | G06F 21/6218 |
| 10,491,475 B2* | 11/2019 | Frizzell | H04L 67/34 |
| 10,609,078 B2 | 3/2020 | Mahadik et al. | |
| 10,826,871 B1 | 11/2020 | Hinkle et al. | |
| 2002/0049806 A1 | 4/2002 | Gatz et al. | |
| 2002/0066034 A1 | 5/2002 | Schlossberg | |
| 2003/0014444 A1 | 1/2003 | Wu | |
| 2003/0123465 A1* | 7/2003 | Donahue | H04L 63/0227 |
| | | | 370/401 |
| 2005/0055578 A1 | 3/2005 | Wright | |
| 2006/0056317 A1 | 3/2006 | Manning | |
| 2006/0143703 A1* | 6/2006 | Hopen | H04L 63/029 |
| | | | 726/15 |
| 2006/0161966 A1 | 7/2006 | Nagampalli | |
| 2006/0236095 A1* | 10/2006 | Smith | H04L 63/0272 |
| | | | 713/153 |
| 2006/0253580 A1 | 11/2006 | Dixon | |
| 2006/0270421 A1 | 11/2006 | Phillips | |
| 2007/0124577 A1 | 5/2007 | Nielsen | |
| 2008/0034404 A1 | 2/2008 | Pereira | |
| 2008/0059426 A1 | 3/2008 | Brock | |
| 2008/0155691 A1 | 6/2008 | Fossen | |
| 2009/0063452 A1 | 3/2009 | Ahn | |
| 2009/0227228 A1 | 9/2009 | Hu | |
| 2009/0248696 A1 | 10/2009 | Rowles | |
| 2010/0014620 A1 | 6/2010 | Levow | |
| 2010/0146260 A1 | 6/2010 | Levow et al. | |
| 2010/0205662 A1 | 8/2010 | Ibrahim | |
| 2010/0318642 A1 | 12/2010 | Dozier | |
| 2010/0318681 A1 | 12/2010 | Shi | |
| 2011/0055912 A1 | 3/2011 | Fusari | |
| 2011/0065419 A1 | 3/2011 | Book | |
| 2011/0119306 A1 | 5/2011 | Patil | |
| 2011/0138064 A1 | 6/2011 | Rieger | |
| 2011/0231479 A1* | 9/2011 | Boydstun | H04L 67/2814 |
| | | | 709/203 |
| 2011/0276716 A1 | 11/2011 | Coulson | |
| 2011/0282997 A1 | 11/2011 | Prince | |
| 2012/0017094 A1* | 1/2012 | Tulchinsky | G06F 21/6263 |
| | | | 713/182 |
| 2012/0084423 A1 | 4/2012 | McGleenon | |
| 2012/0150850 A1 | 6/2012 | Parthasarathy | |
| 2012/0151047 A1 | 6/2012 | Hodges | |
| 2012/0158969 A1 | 6/2012 | Dempsky | |
| 2012/0246553 A1 | 9/2012 | Ong | |
| 2013/0005296 A1 | 1/2013 | Papakostas et al. | |
| 2013/0007245 A1 | 1/2013 | Malik | |
| 2013/0040629 A1 | 2/2013 | Sprigg et al. | |
| 2013/0065555 A1 | 3/2013 | Baker | |
| 2013/0124192 A1 | 5/2013 | Lindmark | |
| 2013/0133032 A1 | 5/2013 | Li | |
| 2013/0138791 A1 | 5/2013 | Thomas et al. | |
| 2013/0339724 A1* | 12/2013 | Amit | H04L 63/0272 |
| | | | 713/151 |
| 2013/0340031 A1* | 12/2013 | Amit | H04L 63/0281 |
| | | | 726/1 |
| 2013/0347058 A1 | 12/2013 | Smith | |
| 2014/0038546 A1 | 2/2014 | Neal | |
| 2014/0089661 A1 | 3/2014 | Mahadik et al. | |
| 2014/0214921 A1 | 7/2014 | Tiger et al. | |
| 2014/0259094 A1 | 9/2014 | Narayanaswamy et al. | |
| 2015/0007307 A1 | 1/2015 | Grimes | |
| 2015/0033298 A1* | 1/2015 | Martini | H04L 67/10 |
| | | | 726/5 |
| 2015/0113600 A1 | 4/2015 | Dulkin | |
| 2015/0143484 A1* | 5/2015 | Violleau | H04L 63/20 |
| | | | 726/6 |
| 2015/0180746 A1 | 6/2015 | Day, II | |
| 2015/0188949 A1 | 7/2015 | Mahaffey | |
| 2015/0213238 A1 | 7/2015 | Farha | |
| 2015/0301982 A1* | 10/2015 | Martini | G06F 21/6218 |
| | | | 709/220 |
| 2015/0381658 A1 | 12/2015 | Poornachandran | |
| 2016/0094645 A1* | 3/2016 | Ashutosh | H04L 61/103 |
| | | | 709/226 |
| 2016/0119291 A1* | 4/2016 | Zollinger | H04L 63/04 |
| | | | 713/171 |
| 2017/0374015 A1* | 12/2017 | Siba | H04L 61/1511 |
| 2019/0014471 A1* | 1/2019 | Saily | H04W 12/04 |
| 2019/0042323 A1 | 2/2019 | Shotton et al. | |
| 2020/0077265 A1 | 3/2020 | Singh et al. | |
| 2020/0186501 A1 | 6/2020 | Neystadt et al. | |
| 2020/0195691 A1 | 6/2020 | Mahadik et al. | |
| 2020/0228540 A1 | 7/2020 | Hinkle et al. | |
| 2020/0322349 A1 | 10/2020 | Hinkle et al. | |

\* cited by examiner

```
// PAC URL: http://securly.com/pf/smart.pac?fid=admin@securlyqa1.com&cluster=scaledev
<?php
header("cache-control: private, max-age=300");
$cookie_name = "proxy_pac_cookie";
if (isset($_COOKIE[$cookie_name])) {
    $cookie_value = $_COOKIE[$cookie_name];
} else {
    // @todo This is just a quicky uniq id function, we should engineer something better before we go production
    $cookie_value = md5(uniqid (rand(), true));
    setcookie($cookie_name, $cookie_value, time() + (86400 * 365 * 10), "/"); // 86400 = 1 day
}
?>
// Variables provided by PHP
var cluster = "<?=$_GET['cluster']?>"; // Used to determine what DNS servers to access
var fid = "<?=$_GET['fid']?>"; // Reserved for future use
var did = "<?=$cookie_value?>"; // Used to track the device
// Variables calculated by the pac
var proxy_server = "PROXY "+cluster+"-dp.securly.com:80";
internal_ip = 0;
function FindProxyForURL(url, host) {
    // Report my ip address
    if (myIpAddress() != internal_ip) {
        internal_ip = myIpAddress();
        dnsResolve(internal_ip+"."+did+".mip."+cluster+".v1api.securly.com");
    }
    // Are we behind securly DNS? If so, use it
    if (dnsResolve("securlydns.securly.com") == "127.0.0.1") {
        // Causes logging to happen for non db16/union sites
        dnsResolve(host+"."+did+".prx."+cluster+".v1api.securly.com");
        return "DIRECT";
    }
    // Is this website interesting from a filter point of view for this customer? Then proxy.
    if (dnsResolve(host+"."+did+".prx."+cluster+".v1api.securly.com") == "127.0.0.2")
        return proxy_server;
    else
        return "DIRECT";
}
```

FIGURE 6

MANAGED NETWORK CONTENT MONITORING AND FILTERING SYSTEM AND METHOD

PRIORITY CLAIMS/RELATED APPLICATIONS

This application claims the benefit under 35 USC 119(e) and priority under 35 USC 120 to U.S. Provisional Patent Application Ser. No. 62/672,964 filed May 17, 2018 and entitled "Managed Network Content Monitoring And Filtering System And Method", the entirety of which is incorporated herein by reference.

FIELD

The disclosure relates generally to a system and method for monitoring and filtering internet content for a managed network.

BACKGROUND

The idea of monitoring and filtering content and web browsing for a managed device is well known. In a first conventional system, an in-line hardware appliance is inserted into the path between the managed network and the Internet to monitor and filter content requests. These in-line hardware appliances require a piece of relatively expensive hardware installed at any ports to the Internet and are difficult to manage by an IT person of the managed network. Other known systems implement a domain name service (DNS) or proxy approach that logs the content request sites and takes filtering actions and is typically implemented in software or the cloud. This proxy type approach requires a huge bandwidth cost if the proxy is proxying all content requests. Some proxy systems use a selective proxying approach in which the proxy chooses which content request will be proxied. However, the selective proxying approach cannot keep up with content development making the selective proxying approach less secure. For example, the selective proxy may have a list of sites that are monitored, but will not be able to log access to a newly created site until the list of monitored sites are updated in the selective proxy. Other known systems use a piece of software installed on each managed device to monitor and filter content. However, to make a commercially viable product, the developer must develop a version of the software for each different managed device and each different operating system which is difficult.

Some known systems use a proxy auto-config (PAC) file that defines how a web browser of each managed device can automatically choose the appropriate proxy server (access method) for fetching a given uniform resource locator (URL). The PAC file contains a Javascript function "FindProxyForURL(url, host)". This function returns a string with one or more access method specifications. These specifications cause the user agent to use a particular proxy server or to connect directly. Like the selective proxying above, this method has the same problem that the proxying is behind the content development resulting in reduced security for the managed network.

All of the above technical problems with existing monitoring and filtering systems result in a need for a monitoring and filtering system that overcomes these limitations and problems with the conventional systems and it is to this end that the disclosure is directed.

BRIEF DESCRIPTION OF THE DRAWINGS

FIG. 6 illustrates an example of a smart proxy auto config file that may be used by the system.

DETAILED DESCRIPTION OF ONE OR MORE EMBODIMENTS

Figure 1:
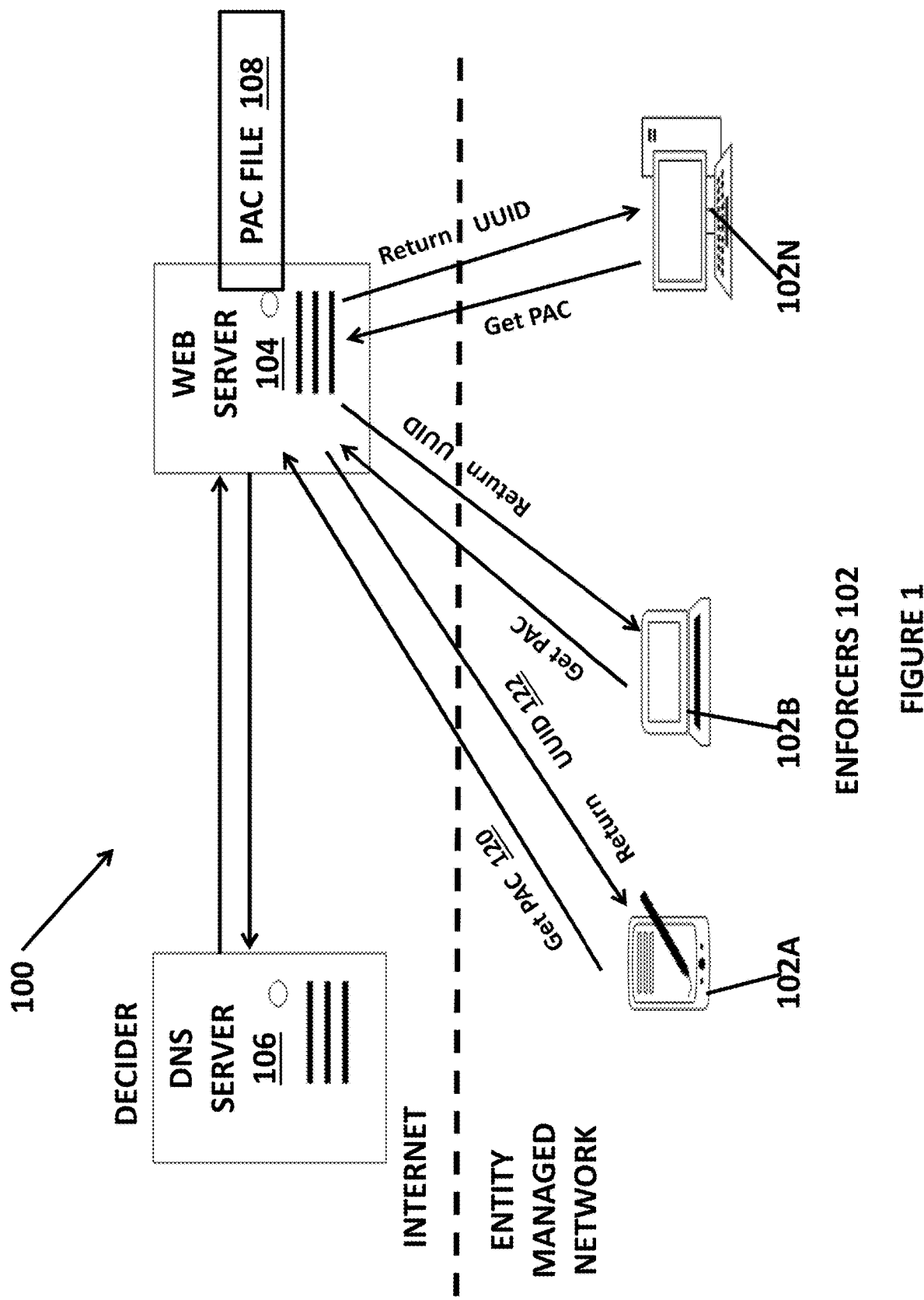
FIG. 1 illustrates an example of a system for monitoring and filtering content for one or more managed devices of a managed network.

The disclosure is particularly applicable to monitoring/logging and filtering content from content requests for a plurality of managed devices connected to an entity managed network and it is in this context that the disclosure will be described. For purposes of illustration, an example use case is described in which the entity is a school district and the managed devices are used by teachers and students, each of whose content is monitored and filtered differently due in part to a proxy auto-config (PAC) file that is unique for each user as described below. It will be appreciated, however, that the system and method has greater utility since it may be used to monitor and filter content for any entity managed network and may also be implemented in different manners than the examples described below and shown in the attached figures.

A system and method for monitoring and filtering content from the Internet based on content requests for a plurality of managed devices that connect to an entity managed network may utilize a smart PAC file, a universally unique identifier (UUID) assigned to each user of each managed device, a domain name service (DNS) lookup to monitor the content request and decide whether the particular request is permitted so that each managed device can then enforce the content filtering decision. The system and method, as described below in more detail, implement a content filtering process that is unconventional, not routine and not well understood. Specifically, since known content filtering system use the techniques described in the background and have been doing so for a long time, the unique combination of processes is unconventional as compared to the known content filtering system, is not routine nor well understood. Furthermore, the disclosed system uses a novel arrangement and location of the elements of the system including the smart PAC file at the web server and the generation of the UUID for each user of the managed device that is returned with the smart PAC file, the synchronization of the UUID to a remote DNS server, the remote DNS server logging/monitoring the content request based on the content request and the UUID of the user making the content request (without proxying all content requests like conventional systems) and the managed device remote from the DNS server and web server enforcing the web content policy for the particular managed device.

The system and method described below further provides a technical solution to the technical problems of the known monitoring and filtering content systems. For example, the disclosed system does not require an expensive hardware appliance at each port or the complicated management required for hardware appliances while still providing the content request monitoring/logging and filtering and the ability to monitor all sites visited as described below. Similarly, the disclosed system does not require proxying each content request that is bandwidth intensive and slow and does not use selective proxying that is less secure. Similarly, the disclosed system does not require installing software on each monitored device or operating system.

FIG. 1 illustrates an example of a system 100 for monitoring and filtering content for one or more managed devices 102 of an entity managed network that is shown below the dotted line in FIG. 1 for content requested from the Internet shown above the dotted line. The system 100 for monitoring and filtering content, like other known systems, acts as a gatekeeper that prevents a user who is using a managed device 102 from accessing certain content or types of content from other networks or the Internet. The system 100, however, accomplishes this goal using a novel arrangement of components and processes that overcomes the problems and limitations of the known systems described above.

The system 100 may include the one or more managed devices 102 each of which is being used by a user employed or associated with the entity, such as teachers, administrators and students at a school district, to access content on an external network or the Internet. The system 100 may be used with any managed device 102 that has a processor, memory and a display in which the processor of the managed device executes a well-known browser application or other application to access content external to the entity managed network (known as external content hereinafter). For example, the managed devices 102 may include a terminal device, a tablet computer, a smartphone device 102A, such as an Apple® iPhone® or Android® operating system based device, a laptop computer 102B, . . . , and a desktop computer 102N. While each managed device 102 is conventional and routine since each is commercially available, the content monitoring and filtering processes achieved using those managed devices is not conventional, well-understood or routine as described below in more detail.

The system 100 may also include a web server 104, a DNS server 106 and a smart PAC file 108 hosted at the web server 104 that collectively provide the content request monitoring and filtering processes. The web server and the DNS server are each conventional and well known pieces of computer hardware, but each have a plurality of lines of computer code executed by a processor of each server that implement the unconventional content request filtering processes described below. Thus, the system uses these well-known computer elements in a novel way and configuration due to the plurality of instructions that perform processes that overcome the limitations and problems with the conventional monitoring and filtering content systems.

The operation of the system will now be described. It should be understood that although the operation is being described as actions being performed by the elements shown in FIG. 1, the content monitoring and filtering method and its processes may be performed using other elements and the method is not limited to the elements shown in FIG. 1 performing the method processes.

Figure 2:
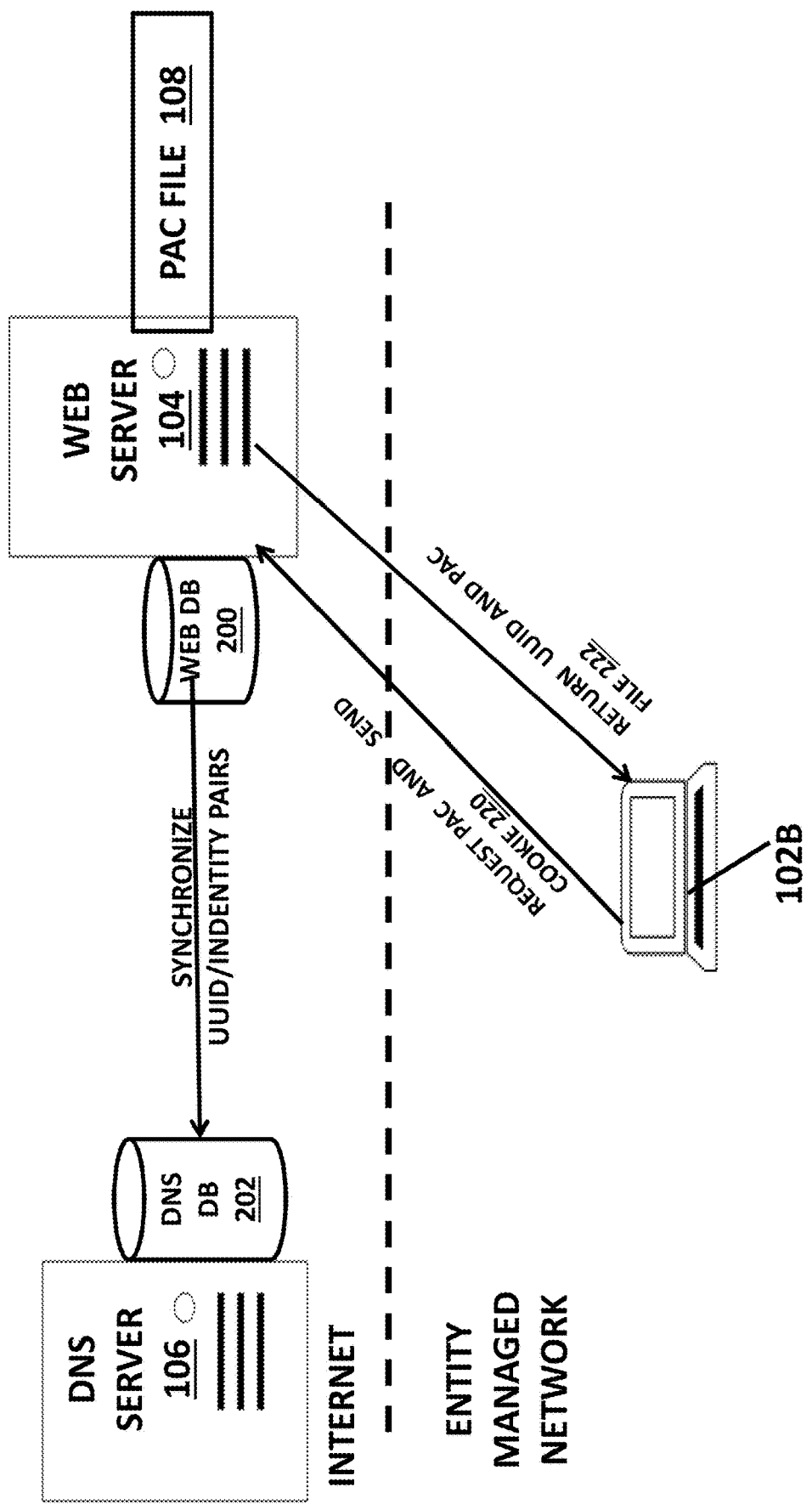
FIG. 2 illustrates the system for monitoring and filtering content of FIG. 1 and its method for associating a customer identifier with a universally unique identifier.

In operation, a network management administrator first configures all devices in the managed network to use a PAC file location (108) hosted on the web server location (104). When a user first submits a content request for content (whether external to the entity managed network or stored within the entity managed network), the browser application of the managed device 102 may issue a GET PAC request 120 to the web server 104 to retrieve a PAC file 108 that contains the method for content specifications for filtering content as described above. In this system, the web server 104 may return a smart PAC file unique to each user 122 wherein that smart PAC file may include a universally unique identifier (UUID) for each user (such as johnsmith@exampleschool.org in an example in which a school district is using the monitoring and filtering system, and usually tracked via web-authentication & cookies by a web server such as 104) that is generated by the web server 104 and returned to the managed device 102 with or as part of the PAC file 108 that is unique for the user. This process may be implemented using remote procedure calls (RPCs) and further details of this process is described below. Thus, in the example in FIG. 1, each managed device 102A-102N receives a unique PAC and the UUID that associates the user with the particular PAC file. Each unique PAC file has the specifications (the policy) that control the content filtering for each user. As part of the above process, the association of the particular PAC with a particular user (and unique ID or tracking number) may be synchronized from a database 200 of the web server 104 onto a database 202 of the domain name service (DNS) server 106 of the web filtering company as shown in FIG. 2. This synchronization allows the domain name service (DNS) server 106 of the web filtering company to perform the DNS lookup for each user and monitor/track and make filtering decisions about the content requests for each user and providing a technical solution.

Figure 3:
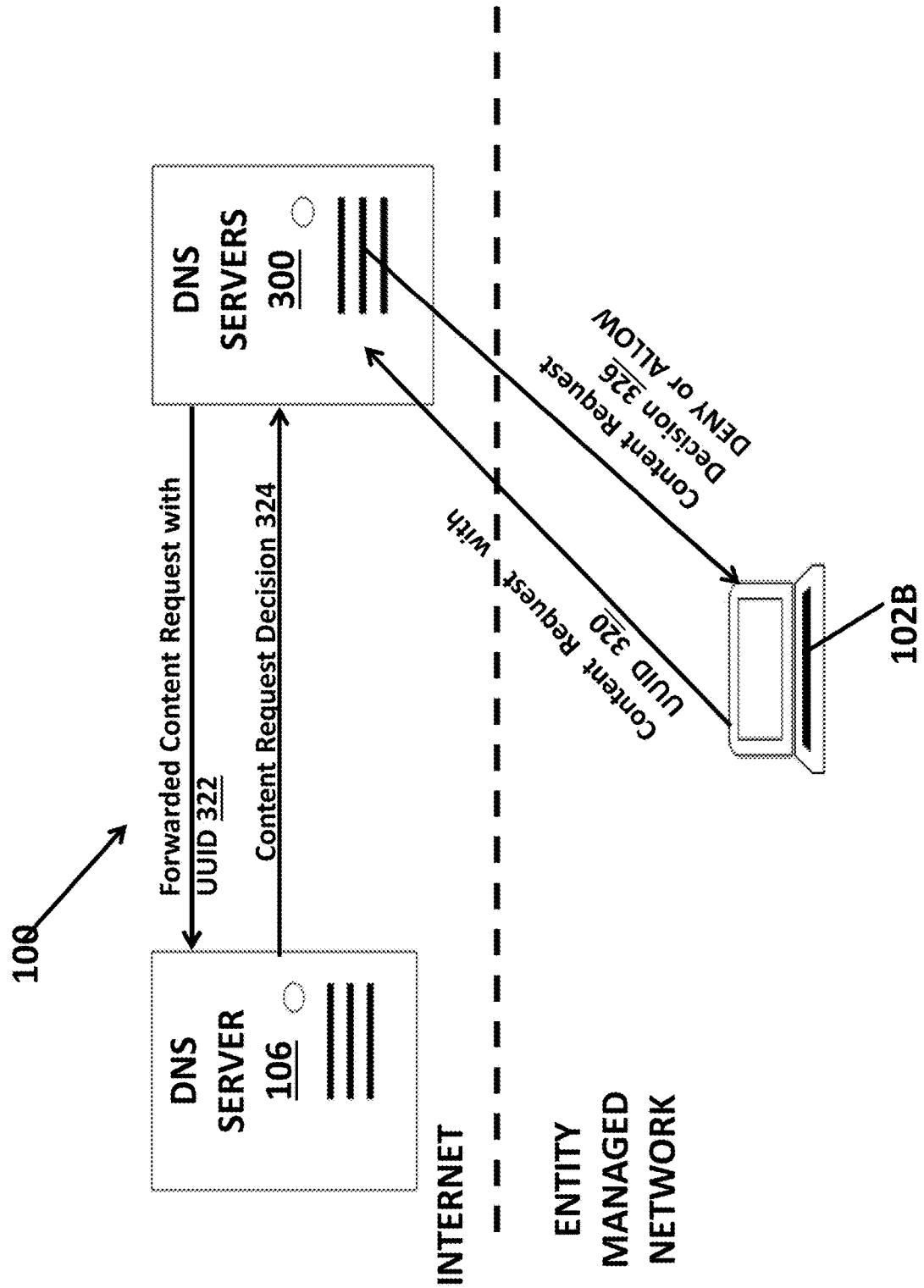
FIG. 3 illustrates the system for monitoring and filtering content of FIG. 1 and its method for monitoring and filtering a content request from a managed device.

When a user of the managed device makes a content request, the content request includes the request for the content (including the host and uniform resource location (URL)) and the UUID. The content request is communicated from the browser to a DNS server 300 of the entity for the managed network and may be passed onto a root DNS server since the content request includes a link to the web filtering company. The content request may then be communicated (322) onto the web filtering company DNS server 106 using RPCs as shown in FIG. 3 as described below in more detail. The web filtering DNS server, through a DNS look-up, may monitor/track the content request and may determine a filtering decision for the particular content request from the particular user based on the UUID as described below in more detail. The web filtering DNS server may also include a process in which a decision is made, for each content request, to either perform the DNS lookup for filtering or use the PAC file and perform typical proxying of the content request that are described below in more detail. The DNS server 106 may communicate the content request decision (324) back to the local DNS server 300. The content request decision may then be communicated back (326) to the managed device 102B and the browser of the managed device 102B enforces the content request decision as shown in FIG. 3.

Figure 4:
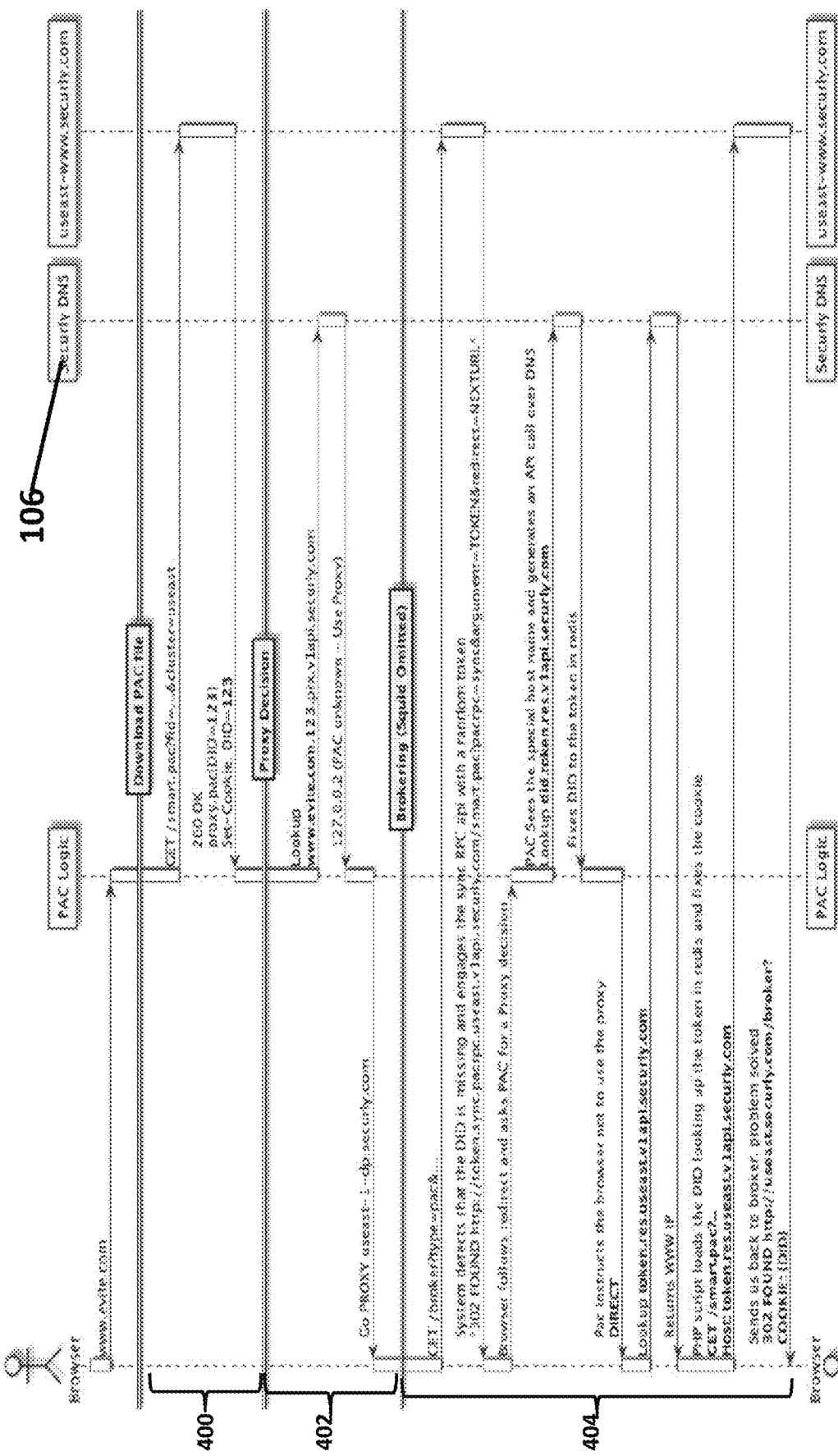
FIG. 4 illustrates a data flow for an exemplary implementation of the method for content request monitoring and filtering.

FIG. 4 illustrates a data flow for an exemplary implementation of the method for content request monitoring and filtering for each content request made by a user using a managed device in the entity managed network. The data flow shown in FIG. 4 shows the process for monitoring and filtering for a managed device and user that needs to obtain the PAC file and the UUID/DID/tracking number since the particular user and managed device is new to the network, has had its cache of cookies with the tracking number flushed or deleted or has not recently accessed Internet content. The entities that are part of the data flow include a browser, PAC logic that may be a part of any browser application, the DNS server 106 and a cluster of web servers (useast-www.securly.com for example) operated by the web filtering company. In the example in FIG. 4, a user is seeking to access content from www.evite.com (a well-known electronic invitation site), but the process in FIG. 4 may be used to monitor and filter access to any type of content and is clearly not limited to accessing any particular type of content.

The data flow may include a process 400 of requesting and receiving the PAC file, a proxy decision process 402 and a brokering process 404. During the process 400, the PAC logic of a browser of a managed device that has not accessed the Internet recently or, is a new managed device on the network, etc. will request a proxy auto-config (PAC) file using a GET command (such as GET/smart. pac?fid- . . . &cluster-useast as shown in FIG. 4) which is a standard process that a browser application performs for a managed device that does not already have a PAC file. However, unlike the typical and conventional PAC file that has methods for access permissions, the smart PAC file has the Javascript code for access permissions (and other code for the content monitoring and filtering an example of which is shown in FIG. 6) and an identifier (or a tracking number) for each managed device and user that is universally unique. In the example in FIG. 4, the cluster useast returns the smart PAC file that include the identifier "123" (called DID in the example—that translates to a user such as johnsmith@exampleschool.org tracked by the web server 104) that universally uniquely identifies the managed device and the user presently using the managed device. In the implementation shown in FIG. 4, a Set-Cookie DID—123 may be used to assign the DID to the managed device and the user presently using the managed device. The tracking number associated with the PAC file that uniquely identifies each managed device and user of the managed device is also associated with a filtering policy for the user and then other systems, like the DNS server 106, receives the tracking number and can execute the appropriate filtering based on the associated policy.

The data flow now proceeds to the proxy decision process 402. During this process 402 and the brokering process 404 shown in FIG. 4, remote procedure calls (RPCs) may be used to communicate and transfer information between different systems including the PAC, the DNS server, the web server, etc. for monitoring and filtering. While it is known and routine to use an RPC call for spam filtering techniques, it is unconventional, not routine and not well understood to use RPC calls for content monitoring and filtering for data communicating (including the host and URL of the content request and the DID/tracking number) between the system elements including the smart PAC 108, the web server 104 and the DNS server 106 of the system. The RPC calls may have the format of: arguments.endpoint.cluster.v1api.securly.com which is a unique and unconventional API interface standard for communicating with the content monitoring and filtering system over the DNS protocol. Each RPC call may have endpoint called on a particular cluster with a series of arguments and return a value. In one example used in FIG. 4, the cluster may be useast and useast.v1api.securly.com is the DNS subdomain used for web content monitoring and filtering. In the above format, the endpoint is a name of an API call such as log, prx or mip, arguments may be a series of text strings separated by period and the return value may be, for example, an IP address (integers), although other return values are possible. In one implementation, a return value, for a prx RPC, of XXX.0.0.2 indicates that a proxy will be used for the particular content request and a return value of XXX.0.0.1 indicates that the DNS lookup process (shown in more detail in FIG. 5) may be performed where XXX is a three digit number.

In the proxy decision process 402, an RPC call is initiated by the PAC logic in the browser from the PAC to the filtering DNS server 106. For example, for a content request to www.evite.com, the RPC call may be www.evite.com/welcome.123.prx.v1api.securly.com where "prx" is the particular RPC call, "123" is the tracking number that associates the PAC file with the particular managed device and user who made the content request. This RPC call provides an unconventional mechanism for the web content monitoring and filtering system to communicate data from the smart PAC to the DNS server 106. In more detail, the RPC call provides PAC navigation logging in that the PAC can transmit information about what hosts and URL the user is visiting ("www.evite.com" being the host and "www.evite.com/welcome" being the URL) and it's PAC identity (the tracking number or DID). The PAC navigation logging allows the DNS server 106 to receive policy information for the particular user and the particular managed device to apply to the hosts/URL's in the content request and take action to log information about the user's activity whether or not the user's content request is proxied as described below. This unconventional technique in the content filtering industry allows the system to log information about the user and his/her content requests while avoiding incurring the expense of proxying the user which is the major competitive advantage.

In the proxy decision process 402 in FIG. 4, the tracking number of the PAC (123 in this example) is not yet known to the DNS server 106 since the synchronization of the PAC and tracking number association with the DNS server 106 has not occurred. Thus since the content request has a tracking number that is unknown, the DNS look up process (based on the RPC) returns 127.0.0.2 indicating that the PAC is unknown (since the DNS server 106 does not have the association of the provided tracking number to any PAC assigned to a particular user and managed device) and to use proxying using the PAC file of the particular user and managed device. The PAC logic receives the response from the DNS server 106 and sends a command to perform proxying for the particular content request.

During the brokering process 404, the tracking number for the particular PAC file assigned to the particular user using the particular managed device may be synchronized to the DNS server 106 so that the DNS server 106 recognizes the particular PAC file and can perform the DNS lookup to monitor and filter the content request of the particular user using the particular managed device. In the example in FIG. 4, since the DID/tracking number associated with the particular PAC file is missing (since the PAC file was only recently assigned the 123 tracking number), the brokering process uses a sync RPC (communicating data from the cluster/DNS server to the browser/smart PAC) with a token (for example http://token.sync.pacprc.useast.v1api.securly.com/smart.pac?parprc=sync&argument=TOKEN&redirect=NEXTURL as shown in FIG. 4) wherein the token is a restore token and the NEXTURL is a URL to redirect back when the brokering is completed. Note this is another example of an unconventional use of a RPC to perform data communications during content monitoring and filtering. In more detail, when the PAC detects the RPC call, the PAC generates a RES DNS RPS call (as shown in FIG. 4) to fix the current DID/tracking number to the TOKEN and synchronize the information about the PAC file and the DID to the DNS server 106. In the brokering process, the browser follows the redirect and asks the PAC for a proxy decision and the PAC logic sees the special host name (v1api.securely.com) and generates an API call over DNS lookup (for example, did.token.res.v1api.securely.com to the DNS server 106) that returns 127.0.0.1 and restores the DID to the cookie (and binds the DID to the token in the database of the DNS server 106) when that association is lost. This is again another example of the unconventional use of an RPC call for content monitoring and filtering. Once the DID to the TOKEN is fixed, the PAC is informed of this and then instructs the browser not to use the proxy and instead use the DNS lookup, such as token.res.useast.v1api.securely.com that is sent to the DNS server 106 that returns decision (allow, deny or partial proxying of the content request). A PHP script in the browser then loads the DID looking up the token in the database (redis in one implementation) and fixes the cookie such as by using GET/smart.pac? . . . HOST:token.res.useast.v1api. securely.com that is sent to the cluster. The cluster sends back a confirmation message that the cookie and DID association is completed.

Figure 5:
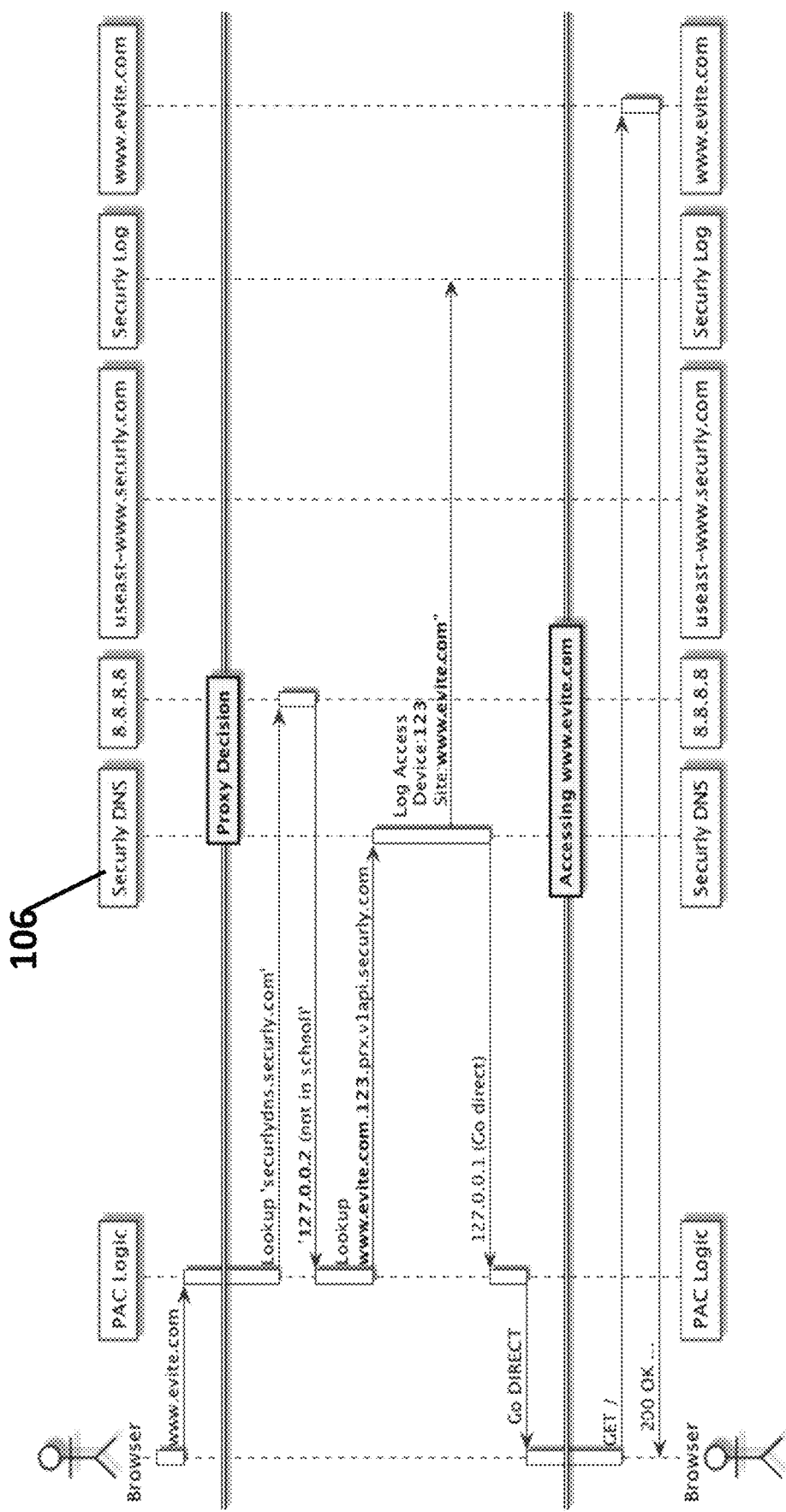
FIG. 5 illustrates a data flow for another exemplary implementation of the method for content request monitoring and filtering.

FIG. 5 illustrates a data flow for another exemplary implementation of the method for content request monitoring and filtering for direct access when the DID of the PAC file for the particular user and particular managed device is known to the DNS server 106 so that a DNS lookup may be used to perform the monitoring and filtering. In this data flow, a user may request data from www.evite.com through the browser and the PAC logic may lookup "securlydns.securly.com" that returns an indication that the user/managed device is not on the managed network at the time of the content request (for example, the managed device is not in school when the system is being used to managed a school network) and the PAC logic generates a DNS lookup (for example, www.evite.com.123.prx.v1api.securely.com) using a RPC call to the DNS server 106. The DNS server 106 logs the content request (device=123 and site is www.evite.com) into a log file (to perform the monitoring/logging aspect of the system without proxying) and the DNS server returns a filtering decision to allow the content request and instructs the PAC file to go direct and the browser then directly accesses the requested content. In this way, the site visited and the user visiting the site, are both logged by the DNS server 106, without the need for any appliance, proxying or software installed on the operating system or device—purely using the PAC file and DNS service of the web-filter company.

The DNS lookup described above incorporates a bypass feature that allows the inventive DNS lookup to disable the PAC file 108 entirely in certain situations. In particular, the system may determine if the content request originates from the managed network or originates from elsewhere (for example child with managed device at home and not on school network in the example of a school district managed network) and adjust the method of filtering while still monitoring/logging the content request. Specifically, if the request originates from a server in the managed network served directly by the web filtering company's DNS service 104, the DNS server 104 is able to detect the direct access based on the source (e.g. via a source IP address lookup) and use an RPC response that requests the PAC file 108 to shut itself down. In this case then the normal DNS lookup monitoring and filtering process is used without any additional involvement of the PAC file 108. However, if the content request is made with the PAC file (not DNS directly since the managed device made the request from a different network), the DNS server 104 is able to detect that the request came via the DNS Root Servers and hierarchical DNS propagation, and request the PAC file to stay active and not shut itself down. In this case then, the PAC file 108 is used in determining filtering although the logging is still performed as is shown in FIG. 5.

The above monitoring and filtering for a content request also has a process to handle when a user logs out from a managed device. In particular, when a user logs out of a managed device, the web server 104 shown in FIG. 1 sends an RPC to the PAC file that flushes the cache and logs thus invalidates the cache and logs to the PAC. Thus process also flushes the tracking number/DID association with the user identifier and the token discussed above. When another user or the same user (a "new user" for purposes of the monitoring and filtering) log onto the managed device, the system performs the process of FIG. 4 to associate the PAC file of the "new" user with a tracking number and performs the brokering. In this manner, the content monitoring and filtering system handles when a user logs out of a managed device and prevents, for example, a teacher's content profile that is more liberal than student's content profile, from being used by a student who subsequently logs into the managed device. The above process also handles a situation of a shared managed device wherein the different users may have a different content filtering profile since the logging out of each user nullifies the content policy of that user. The above process also handles the situation in which a nefarious user is trying to circumvent the content filtering system by deleting the cookies stored in the browser of the managed device since the deletion of the cookies causes the process of FIG. 4 to be executed as if the user is logging into the managed device for the first time.

The PAC file for a user and managed device and its association to the tracking number may also be used for internal IP address fusing/tracking. In particular, different PAC's on the same client IP can be fused together for the purpose of applying policy data using their "Internal IP" that is the private IP the device is registered under on the entity managed network that is normally invisible to cloud providers. This IP address tracking/fusing allows the above described system to execute on content policy using that internal IP like a physical appliance is able to do, but without the limitations and drawbacks of the physical appliance. In more detail, the PAC file may be tracked for an app executing on the managed device. Although the app has no login that would normally allow the content monitoring and filtering, the user still logs into the browser so that the system can monitor and filter content for the apps as described above.

In addition to the monitoring and filtering activities described above carried out using the smart PAC file and the universally unique identifier for the user and managed device, the smart PAC file and the system may also be used to provide a pause feature and/or a time scheduling feature. The pause feature may enable the internet (access to a network outside of the entity network) to be remotely paused and then resumed for any particular managed device at any particular time. The pause feature may be implemented by the web server sending a pause instruction to the smart PAC of a particular managed device or one or more managed devices. The instruction may be send using an RPC as described above. In one implementation, the pause instruction may result in access being denied to all outside resources. At the end of the pausing of the Internet (whenever that may be), the web server may send a normal operation (or stop pause) command using the same processes described above and the filtering policy associated with the universally unique identifier for the managed device will be used again to monitor and filter the content.

The time scheduling feature may allow for time scheduled monitoring and filtering of content for all web sites (or a particular web site) for a managed device instead of the static monitoring and filtering that operates at all times. For example, a time schedule may be created for a managed device being used by a particular user, such as a student, and a user of the system, such as a parent or the school or whomever has authority to set permissions for the user of the managed device. That user can create or change the allow/deny monitoring and filtering rules (that are part of the monitoring and filtering process) based on a time schedule for the managed device so that the monitoring and filtering may be performed on a time schedule. The system may allow the user to change/create the monitoring and filtering rules on the fly. For example, for a student at a school, the monitoring and filtering rules may be different at different times of the day, such as homework time in which access may be denied to all non-educational sites, bed time in which all access is denied and a fun/gaming time when the student is allowed to access certain sites. This time schedule feature can be implemented similar to the pause feature and the web server may communicate instructions about the time schedule and the monitoring and filtering rules during each time period to the smart PAC that can implement those changes.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method for restoring an identifier, comprising:
providing a managed device of an entity, the managed device having a smart proxy auto-configure (PAC) file that is unique to the managed device and a user of the managed device, the smart PAC file having a plurality of lines of instructions that monitor and filter content being requested by the managed device using a filtering policy and a unique identifier;
receiving a restore token from a domain name service (DNS) server;
communicating, from the smart PAC file in response to the restore token, the unique identifier of the smart PAC file to the DNS server to restore the unique identifier to the restore token; and
synchronizing the unique identifier of the smart PAC file to the DNS server in response to the restore token to monitor and filter content requested by the managed device at the DNS server using the filtering policy identified by the smart PAC file unique identifier.

2. The method of claim 1, wherein receiving the restore token further comprises receiving the restore token from the DNS server using a sync remote procedure call.

3. The method of claim 1, wherein synchronizing the unique identifier of smart PAC file associated with the restore token further comprises binding the unique identifier to the token in a database of the DNS server.

4. A system comprising:
an entity network comprising a domain name service (DNS) server;
a managed computing device being capable of coupling to the entity network, the managed computing device having a processor and a browser application executed by the processor, the managed computing device having a smart proxy auto-configure (PAC) file that is unique to the managed computing device and a user of the managed computing device, the smart PAC file having a plurality of lines of instructions that monitor and filter content being requested by the managed computing device using a filtering policy and a universally unique identifier that uniquely identifies the managed computing device and the user of the managed computing device and associates the managed computing device and the user of the managed computing device with the filtering policy contained in the smart PAC file;
the DNS server having a processor and a plurality of lines of instructions that is configured to communicate a restore token to the managed computing device;
the smart PAC file being configured to communicate the unique identifier of the smart PAC file to the DNS server to restore the unique identifier to the restore token; and the DNS server being further configured to receive a synchronization from the smart PAC file of the unique identifier of smart PAC file in response to the restore token to monitor and filter content requested by the managed device at the DNS server using the filtering policy identified by the smart PAC file unique identifier.

5. The system of claim 4, wherein the DNS server is further configured to communicate the restore token using a sync remote procedure call.

6. The system of claim 4, wherein the DNS server is further configured to bind the unique identifier to the token in a database of the DNS server.

\* \* \* \* \*